US011555757B2

(12) United States Patent
Saburi et al.

(10) Patent No.: US 11,555,757 B2
(45) Date of Patent: Jan. 17, 2023

(54) MONITORING DEVICE, MONITORING METHOD, METHOD OF CREATING SHAFT VIBRATION DETERMINATION MODEL, AND PROGRAM

(71) Applicant: MITSUBISHI HEAVY INDUSTRIES COMPRESSOR CORPORATION, Tokyo (JP)

(72) Inventors: Satoshi Saburi, Tokyo (JP); Ryoji Ogasawara, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 14 days.

(21) Appl. No.: 16/789,185

(22) Filed: Feb. 12, 2020

(65) Prior Publication Data

US 2020/0271544 A1 Aug. 27, 2020

(30) Foreign Application Priority Data

Feb. 27, 2019 (JP) .............................. JP2019-033539

(51) Int. Cl.
*G01M 7/02* (2006.01)
*G06N 20/20* (2019.01)
*G01M 13/045* (2019.01)

(52) U.S. Cl.
CPC .......... *G01M 7/025* (2013.01); *G01M 13/045* (2013.01); *G06N 20/20* (2019.01)

(58) Field of Classification Search
None
See application file for complete search history.

(56) References Cited

U.S. PATENT DOCUMENTS

2012/0330577 A1* 12/2012 Kar .................. G01H 1/003
702/56
2017/0270834 A1* 9/2017 Vandyk ................. A41D 27/08
(Continued)

FOREIGN PATENT DOCUMENTS

DE    102014114990 A1 *  4/2015  ............. G01M 15/14
EP      1014054 A2 *  6/2000  ............. G01H 1/003
(Continued)

OTHER PUBLICATIONS

Machine translation of Sakaguchi (Year: 2015).*

*Primary Examiner* — Matthew G Marini
(74) *Attorney, Agent, or Firm* — Osha Bergman Watanabe & Burton LLP

(57) ABSTRACT

A monitoring device includes a process data acquisition unit configured to acquire process data indicating an operation condition of a machine having a rotating shaft, a shaft vibration value acquisition unit configured to acquire a measurement value of a shaft vibration value of the rotating shaft under the operation condition indicated by the process data, a determination model configured to determine a normal value of the shaft vibration value according to the operation condition created on the basis of the shaft vibration value measured during an operation of the machine and the shaft vibration value calculated on the basis of a predetermined shaft vibration calculation model, and a monitoring unit configured to evaluate the measurement value of the shaft vibration value on the basis of the process data, the measurement value of the shaft vibration value, and the determination model.

9 Claims, 7 Drawing Sheets

(56) References Cited

U.S. PATENT DOCUMENTS

2018/0059656 A1    3/2018  Hiruta et al.
2018/0260720 A1*  9/2018  Wu .......................... G06N 5/04

FOREIGN PATENT DOCUMENTS

| | | | |
|---|---|---|---|
| JP | H05-312690 A | | 11/1993 |
| JP | H07-286892 A | | 10/1995 |
| JP | 2004-169624 A | | 6/2004 |
| JP | 5461136 B2 | | 4/2014 |
| JP | 2015031563 A | * | 2/2015 .......... G01M 13/045 |
| JP | 2018-146436 A | | 9/2018 |
| WO | 2016/143118 A1 | | 9/2016 |

* cited by examiner

MONITORING DEVICE, MONITORING METHOD, METHOD OF CREATING SHAFT VIBRATION DETERMINATION MODEL, AND PROGRAM

BACKGROUND OF THE INVENTION

Field of the Invention

The present invention relates to a shaft vibration monitoring device, a monitoring method, a method of creating a shaft vibration determination model, and a non-transitory computer readable medium storing a program.

Priority is claimed on Japanese Patent Application No. 2019-033539, filed Feb. 27, 2019, the content of which is incorporated herein by reference.

Description of Related Art

In the monitoring of abnormalities of shaft vibrations of a turbomachine, a method of monitoring whether or not the vibrations exceed a predetermined threshold value and providing a notification of an alarm when the vibrations exceed the threshold value is general. For example, Patent Document 1 discloses a monitoring device for performing signal processing on a vibration signal measured during an operation of a rotating machine, setting a threshold value for abnormality determination, and performing abnormality monitoring on the basis of the threshold value.

Also, a method of determining whether a driving state is normal or abnormal using machine learning has been provided in recent years. In order to perform monitoring utilizing machine learning, it is necessary to operate a machine to be monitored during a fixed period to collect learning data and subsequently perform determination on the basis of the collected learning data. In general, a data collection period of about six months to one year is required before monitoring starts.

PATENT DOCUMENTS

[Patent Document 1] Japanese Unexamined Patent Application, First Publication No. H5-312690

SUMMARY OF THE INVENTION

For example, operation conditions such as a rotational speed, a bearing oil film temperature, and a load change in a normal range in a compressor for a chemical plant. When the operation conditions change, a shaft vibration value also changes. If abnormality monitoring is performed with a threshold value set without considering changes in operation conditions, a normal shaft vibration value may be determined to be abnormal. It is necessary to detect only true abnormalities without erroneously detecting the shaft vibration value affected by the change in the operation condition. Therefore, for example, a method of collecting operation data while changing the operation conditions in a normal range and learning the collected operation data as learning data is conceivable. However, when the collection period of learning data is taken into account, it is difficult to start monitoring immediately after the introduction of the turbomachine in the method.

Therefore, an objective of the present invention is to provide a monitoring device, a monitoring method, a method of creating a shaft vibration determination model, and a non-transitory computer readable medium storing a program capable of solving the above-described problems.

According to an aspect of the present invention, there is provided a monitoring device including: a process data acquisition unit configured to acquire process data indicating an operation condition of a machine having a rotating shaft; a shaft vibration value acquisition unit configured to acquire a measurement value of a shaft vibration value of the rotating shaft under the operation condition indicated by the process data; a determination model configured to determine a normal value of the shaft vibration value according to the operation condition created on the basis of the shaft vibration value measured during an operation of the machine and the shaft vibration value calculated on the basis of a predetermined shaft vibration calculation model; and a monitoring unit configured to evaluate the measurement value of the shaft vibration value on the basis of the process data, the measurement value of the shaft vibration value, and the determination model.

According to an aspect of the present invention, the monitoring device further includes: a shaft vibration calculation model creation unit configured to create the shaft vibration calculation model; and a shaft vibration analysis unit configured to calculate a shaft vibration value corresponding to the operation condition of a predetermined range using the shaft vibration calculation model, wherein the shaft vibration analysis unit is configured to calculate the shaft vibration value in the operation condition that does not occur during the operation of the machine.

According to an aspect of the present invention, the monitoring device further includes a determination model creation unit configured to create the determination model.

According to an aspect of the present invention, when a set of the process data acquired at the time of a trial operation in a manufacturing factory before shipment or a trial operation before an actual operation and a measurement value of a shaft vibration value corresponding thereto is used as first learning data and a set of the shaft vibration value calculated on the basis of the shaft vibration calculation model identified by a system using the first learning data and process data indicating the operation condition corresponding thereto is used as second learning data, the determination model creation unit is configured to create an initial determination model that is the determination model based on the first learning data and the second learning data before the actual operation starts.

According to an aspect of the present invention, when a set of the process data acquired at the time of a test operation in a manufacturing factory before shipment or a trial operation before an actual operation and a measurement value of the shaft vibration value corresponding thereto is used as third learning data, the shaft vibration calculation model creation unit is configured to perform system identification of the shaft vibration calculation model on the basis of the third learning data before the actual operation starts.

According to an aspect of the present invention, when a set of the process data acquired at the time of the actual operation and a measurement value of the shaft vibration value corresponding thereto is used as fourth learning data and a set of the shaft vibration value calculated on the basis of the shaft vibration calculation model identified by the system using the fourth learning data and process data indicating the operation condition corresponding thereto is used as fifth learning data, the determination model creation unit is configured to update the initial determination model on the basis of the fourth learning data and the fifth learning data after the actual operation starts.

According to an aspect of the present invention, the determination model creation unit is configured to update the initial determination model when a difference between a shaft vibration value calculated on the basis of the process data and the initial determination model and a measurement value of the shaft vibration value is in a predetermined range.

According to an aspect of the present invention, when a set of the process data acquired at the time of the actual operation and a measurement value of the shaft vibration value corresponding thereto is used as sixth learning data, the shaft vibration calculation model creation unit is configured to perform system identification of the shaft vibration calculation model on the basis of the sixth learning data after the actual operation starts.

According to an aspect of the present invention, the operation condition includes a rotational speed of the rotating shaft or an oil film temperature of a sliding bearing for supporting the rotating shaft.

According to an aspect of the present invention, there is provided a monitoring method including the steps of: acquiring process data indicating an operation condition of a machine having a rotating shaft; acquiring a measurement value of a shaft vibration value of the rotating shaft under the operation condition indicated by the process data; and evaluating the measurement value of the shaft vibration value on the basis of a determination model for determining a normal value of the shaft vibration value according to the operation condition created on the basis of the shaft vibration value measured during an operation of the machine and the shaft vibration value calculated on the basis of a predetermined shaft vibration calculation model, the process data, and the measurement value of the shaft vibration value.

According to an aspect of the present invention, there is provided a method of creating a shaft vibration determination model, the method including the steps of: acquiring process data indicating an operation condition of a machine having a rotating shaft; acquiring a measurement value of a shaft vibration value of the rotating shaft under the operation condition indicated by the process data; creating a shaft vibration calculation model of the rotating shaft; calculating the shaft vibration value corresponding to the operation condition of a predetermined range using the shaft vibration calculation model; and creating a determination model for determining a normal value of the shaft vibration value according to the operation condition on the basis of the process data, the measurement value of the shaft vibration value, the calculated shaft vibration value, and the process data indicating the operation condition corresponding to the shaft vibration value.

According to an aspect of the present invention, there is provided a non-transitory computer readable medium storing a program for causing a computer to function as: a means for acquiring process data indicating an operation condition of a machine having a rotating shaft; a means for acquiring a measurement value of a shaft vibration value of the rotating shaft under the operation condition indicated by the process data; and a means for evaluating the measurement value of the shaft vibration value on the basis of a determination model for determining a normal value of the shaft vibration value according to the operation condition created on the basis of the shaft vibration value measured during an operation of the machine and the shaft vibration value calculated on the basis of a predetermined shaft vibration calculation model, the process data, and the measurement value of the shaft vibration value.

According to an aspect of the present invention, there is provided a non-transitory computer readable medium storing a program for causing a computer to function as: a means for acquiring process data indicating an operation condition of a machine having a rotating shaft; a means for acquiring a measurement value of a shaft vibration value of the rotating shaft under the operation condition indicated by the process data; a means for creating a shaft vibration calculation model of the rotating shaft; a means for calculating the shaft vibration value corresponding to the operation condition of a predetermined range using the shaft vibration calculation model; and a means for creating a determination model for determining a normal value of the shaft vibration value according to the operation condition on the basis of the process data, the measurement value of the shaft vibration value, the calculated shaft vibration value, and the process data indicating the operation condition corresponding to the shaft vibration value.

According to the present invention, even when a shaft vibration value changes due to an influence of a change in an operation condition, the shaft vibration value is evaluated on the basis of a reference according to the operation condition, so that erroneous detection can be prevented. Also, it is possible to create a determination model for enabling the shaft vibration value to be evaluated with respect to various operation conditions before an operation is actually performed under the operation condition.

DETAILED DESCRIPTION OF THE INVENTION

Embodiments

Hereinafter, a shaft vibration monitoring device and a shaft vibration determination model creation method according to embodiments of the present invention will be described with reference to FIGS. 1 to 7.

Figure 1:
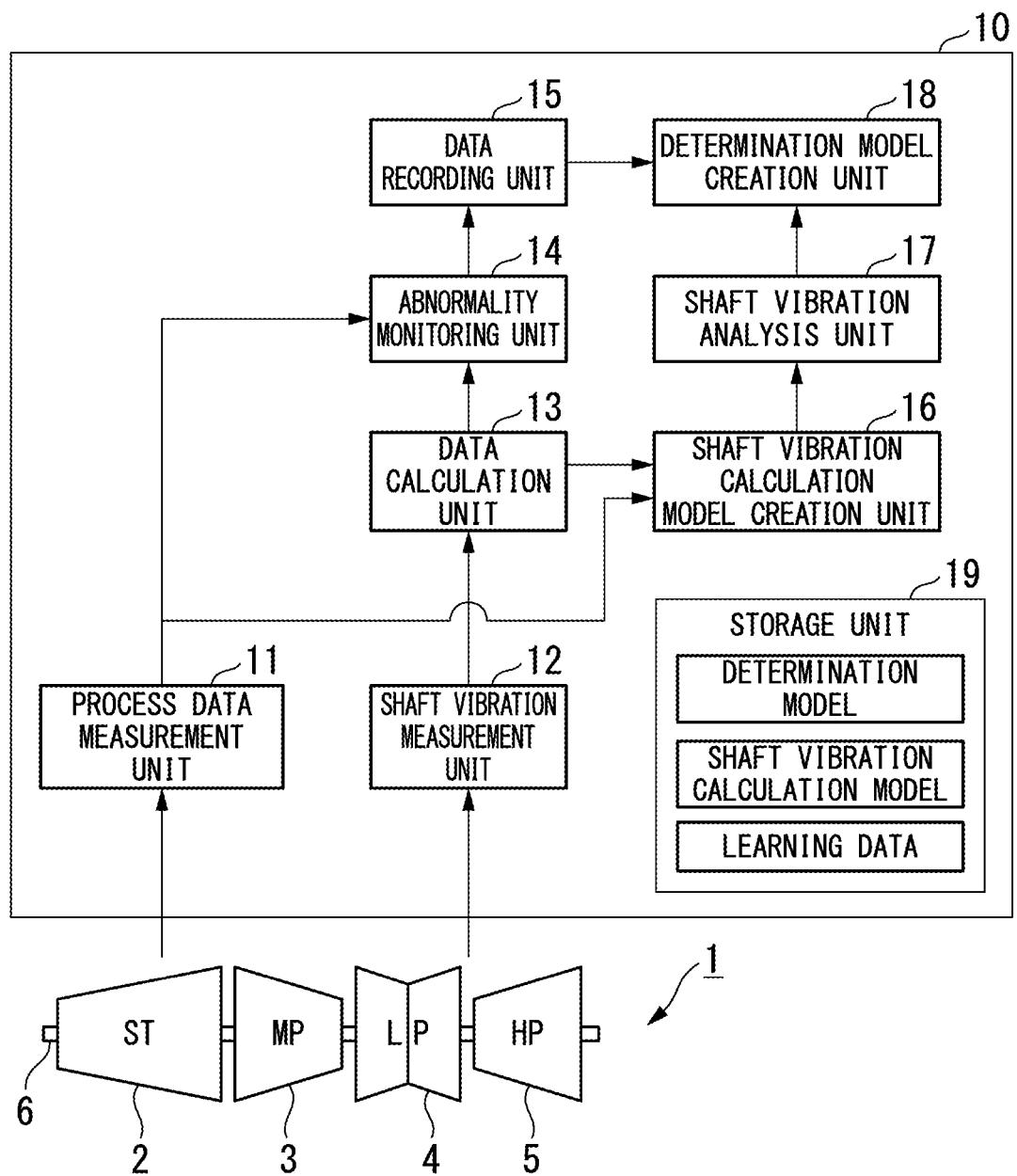
FIG. 1 is a schematic diagram of a system according to an embodiment of the present invention.

FIG. 1 is a schematic diagram of a system according to an embodiment of the present invention.

In FIG. 1, a plant 1 to be monitored and a monitoring device 10 are shown. The plant 1 includes a steam turbine 2 and a medium pressure compressor 3, a low pressure compressor 4, and a high pressure compressor 5 that are rotationally driven by the steam turbine 2. The steam turbine 2, the medium pressure compressor 3, the low pressure compressor 4, and the high pressure compressor 5 are connected by a rotor 6 and rotate around the rotor 6. The rotor 6 is supported by a bearing base (not shown) at a plurality of positions. Each bearing base includes a bearing (not shown) and the bearing base supports the rotor 6 via the bearing, so that the rotor 6 can rotate. A bearing (for example, a sliding bearing) is provided with a vibration sensor such as a gap sensor and a temperature sensor. Also, the rotor 6 is provided with a rotation sensor. The vibration sensor, the temperature sensor, and the rotation sensor are connected to the monitoring device 10. The vibration sensor measures shaft vibrations generated with the rotation of the rotor 6 and outputs a measurement result to the monitoring device 10. The temperature sensor measures a temperature of the bearing and outputs a measurement result to the monitoring device 10. The rotation sensor measures a rotational speed of the rotor 6 and outputs a measurement result to the monitoring device 10.

Figure 2:
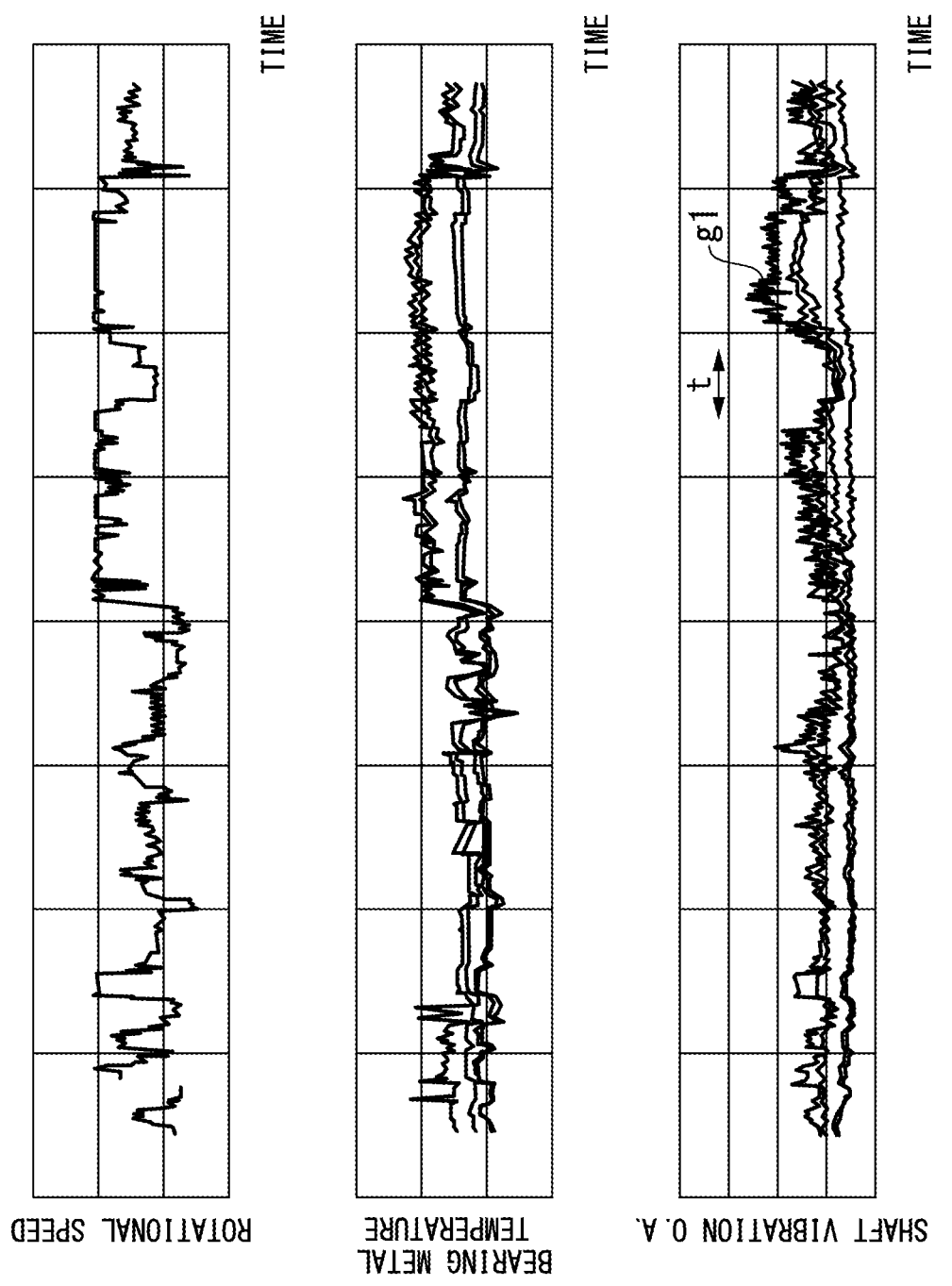
FIG. 2 is a diagram showing examples of changes in shaft vibrations with respect to changes in operation conditions according to an embodiment of the present invention.

The monitoring device 10 is a device that monitors a state of shaft vibrations of the rotor 6. The operation conditions (a rotational speed and a bearing temperature) of the plant 1 change in various manners and a range of shaft vibrations changes in accordance with the change. A state of the change is shown in FIG. 2. FIG. 2 is a diagram showing examples of changes in shaft vibrations with respect to changes in operation conditions according to an embodiment of the present invention.

A graph representing a change over time in the rotational speed of the rotor 6 is shown in the upper part of FIG. 2. A graph representing a change over time in the bearing temperature is shown in the middle part of FIG. 2. A graph representing a change over time in shaft vibrations is shown in the lower part of FIG. 2. The same position on the horizontal axis of each graph indicates the same time. The plant 1 operates at various rotational speeds in accordance with a request. All changes in the rotational speed shown in the graph of the upper part of FIG. 2 are performed in a normal range. Also, as shown in the graph of the middle part of FIG. 2, the temperature of the bearing that supports the rotor 6 changes in various manners. The shaft vibrations of the rotor 6 also change under the influence of changes in the rotational speed and the bearing temperature (the lower graph of FIG. 2). The change in the bearing temperature is related to the change in the temperature of the oil film of the bearing, and spring characteristics of the oil film changes depending on the temperature and thus affects the shaft vibrations. Here, when attention is paid to shaft vibration data g1 measured in a certain bearing, the shaft vibration value greatly decreases during a period t. Although the decrease in the shaft vibration value is accompanied by a decrease in the rotational speed in the normal range and is normal behavior, there is a possibility that the decrease will be determined to be abnormal if monitoring is performed without considering changes in operation conditions. On the other hand, the monitoring device 10 acquires the operation condition and the shaft vibration value and evaluates the shaft vibration value on the basis of a reference according to the operation condition. Also, although deterioration over time at a level that does not hinder the actual operation should be determined to be normal because the vibration characteristics of the rotor 6 change due to the deterioration over time, there is a possibility that a change in the shaft vibration value due to slight deterioration over time will be erroneously detected to be abnormal when the normality and abnormality are evaluated on the basis of the reference at the time of the start of the operation. On the other hand, the monitoring device 10 evaluates the shaft vibration value on the basis of a reference according to a change in vibration characteristics due to the deterioration over time.

As shown in FIG. 1, the monitoring device 10 includes a process data measurement unit 11, a shaft vibration measurement unit 12, a data calculation unit 13, an abnormality monitoring unit 14, a data recording unit 15, a shaft vibration calculation model creation unit 16, a shaft vibration analysis unit 17, a determination model creation unit 18, and a storage unit 19.

The process data measurement unit 11 acquires process data indicating the operation conditions of the plant 1. For example, the process data measurement unit 11 acquires the rotational speed of the rotor 6 measured by a rotation sensor and acquires the bearing temperature measured by a temperature sensor.

The shaft vibration measurement unit 12 acquires a value measured by a vibration sensor. For example, the shaft vibration measurement unit 12 acquires a voltage value corresponding to a distance between the bearing and the rotor 6 measured by a gap sensor. The data calculation unit 13 converts the voltage value acquired by the shaft vibration measurement unit 12 or the like into a shaft vibration value. Also, the shaft vibration value is represented by, for example, amplitude waveform data.

The abnormality monitoring unit 14 determines whether the shaft vibrations of the rotor 6 are normal or abnormal on the basis of the process data acquired by the process data measurement unit 11, the shaft vibration value calculated by the data calculation unit 13, and the determination model generated by the determination model creation unit 18.

The data recording unit 15 associates the process data and the shaft vibration value when the abnormality monitoring unit 14 determines that the shaft vibrations of the rotor 6 are normal and writes and saves the process data and the shaft vibration value which are associated in the storage unit 19. The saved data is used as learning data for creating a determination model.

Figure 3:
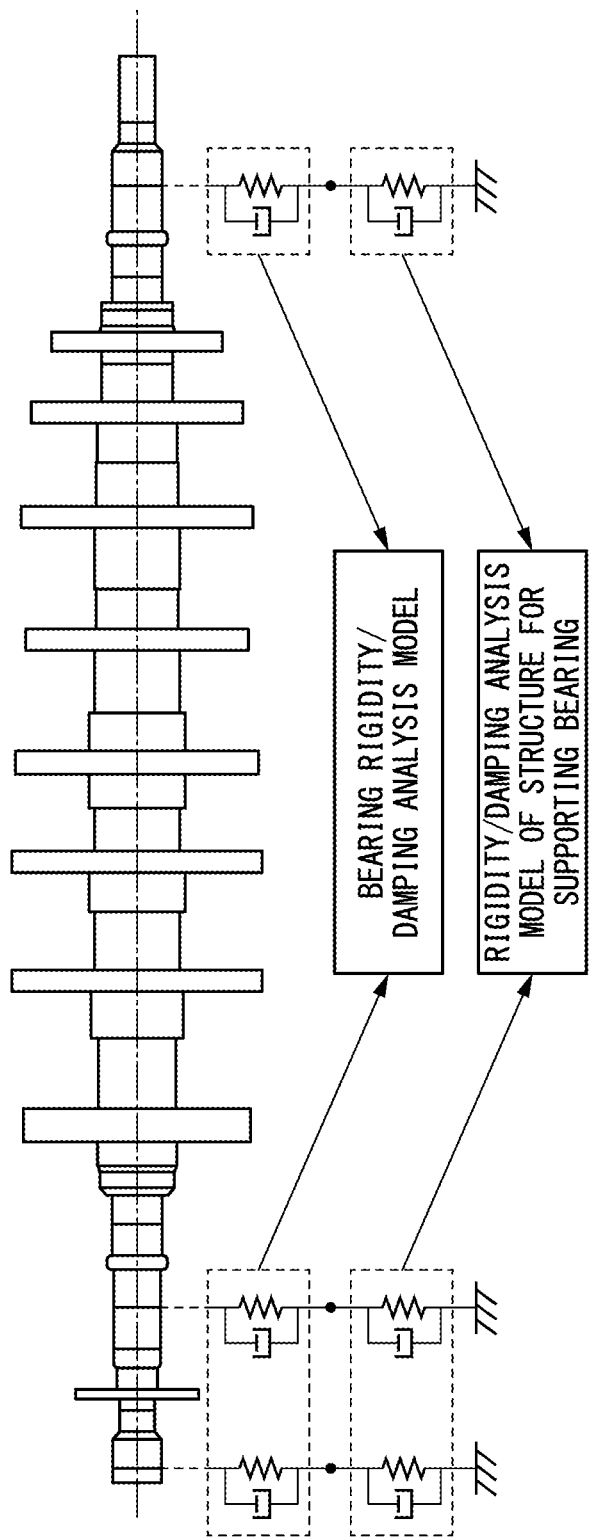
FIG. 3 is an explanatory diagram showing a shaft vibration calculation model according to an embodiment of the present invention.

The shaft vibration calculation model creation unit 16 creates a shaft vibration calculation model and performs system identification of the shaft vibration calculation model. The system identification model is a dynamic physical model for simulating the shaft vibrations generated in the rotor 6. For example, when the rotational speed and the bearing temperature of the rotor 6 are input, the shaft vibration value generated when the rotor 6 is driven under the operation conditions is output. The shaft vibration calculation model is used for ascertaining a critical speed and a Q value of the rotor 6 and ascertaining changes in bearing rigidity and damping characteristics due to a change in the bearing temperature in a factory test of the plant 1 and the like. The shaft vibration calculation model creation unit 16 performs system identification of the shaft vibration calculation model using the process data acquired by the process data measurement unit 11 and the shaft vibration value calculated by the data calculation unit 13 during a test operation in the factory or a trial operation when the plant 1 is introduced. The shaft vibration calculation model creation unit 16 particularly identifies the rigidity and damping characteristics of the bearing support portion (FIG. 3).

The shaft vibration analysis unit 17 calculates shaft vibration values under various operation conditions in the normal range using the shaft vibration calculation model identified by the system by means of the shaft vibration calculation model creation unit 16. In the factory test before shipment and the trial operation at the time of local installation, it is not possible to perform testing and adjustment by actually performing the operation with respect to all the operation conditions in the normal range. Accordingly, the shaft vibration analysis unit 17 inputs a rotational speed and a bearing temperature changed in various manners in the normal range as input parameters to the shaft vibration calculation model and acquires a shaft vibration value calculated using the shaft vibration calculation model. The shaft vibration analysis unit 17 writes and saves data obtained by combining the rotational speed, the bearing temperature, and the shaft vibration value as a set in the storage unit 19. The saved data is used as learning data for creating a determination model. An example of data analyzed by the shaft vibration analysis unit 17 is shown in FIG. 4.

Figure 4:
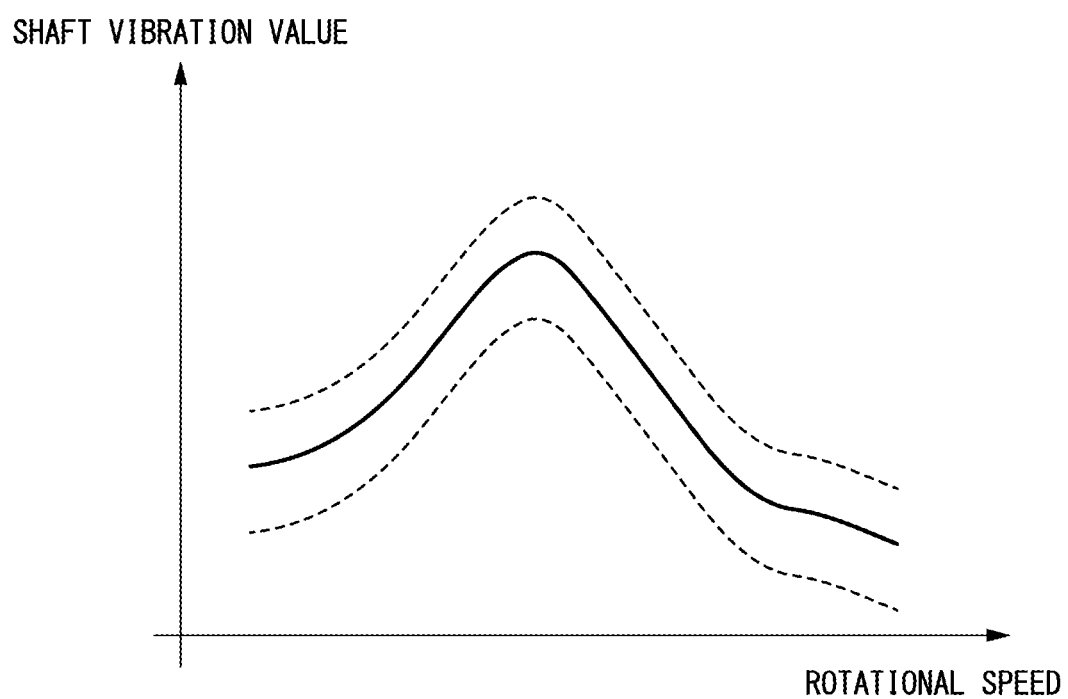
FIG. 4 is a diagram showing an example of an analysis result from the shaft vibration calculation model according to an embodiment of the present invention.

FIG. 4 is a diagram showing an example of an analysis result from a shaft vibration calculation model according to an embodiment of the present invention.

In the graph of FIG. 4, the vertical axis represents a shaft vibration value and the horizontal axis represents a rotational speed. The solid line graph shows a measurement result of the shaft vibration value when an operation has been performed while fixing the bearing temperature and changing the rotational speed of the rotor 6. The broken line graph shows the shaft vibration value at each rotational speed when the bearing temperature is changed to the maximum in the normal range. By using the shaft vibration calculation model, it is possible to identify a range in which the shaft vibration value can be taken when the rotational speed has been changed (a range between broken line graphs).

Likewise, the shaft vibration analysis unit 17 can calculate the shaft vibration value on the basis of the shaft vibration calculation model when the rotational speed is fixed and the bearing temperature of the rotor 6 is changed. Thereby, it is possible to identify a range in which the shaft vibration value can be taken when the bearing temperature is changed.

The shaft vibration analysis unit 17 saves a corresponding relationship between the operation condition and the shaft vibration value when the operation condition has been changed in the normal range in the storage unit 19. In this manner, it is possible to supplement learning data that cannot be collected in the actual operation by calculating data that cannot be collected in the actual operation using the shaft vibration calculation model.

The determination model creation unit 18 creates a determination model for determining a shaft vibration value to be measured when the rotor 6 is rotating in a normal operation state under various operation conditions using learning data saved in the storage unit 19 by the data recording unit 15 and learning data saved in the storage unit 19 by the shaft vibration analysis unit 17. The determination model may be, for example, a database in which a data set including a combination of the rotational speed, the bearing temperature, and the shaft vibration value is collected. Alternatively, the determination model may be a function that defines relationships between the rotational speed, the bearing temperature, and the shaft vibration value. Also, the determination model creation method may be arbitrary. For example, the determination model creation unit 18 may create a determination model for defining a value (V1 to V2) of a predetermined range including an average value V as a normal shaft vibration value in the case of rotational speeds R1 to R2 and bearing temperatures T1 to T2 by aggregating learning data saved in the storage unit 19 according to a rotational speed of a predetermined range and a bearing temperature of a predetermined range and obtaining the average value V of the shaft vibration value measured or calculated with respect to rotational speeds (for example, R1 to R2 rpm) of a certain range and bearing temperatures (T1 to T2° C.) of a certain range. Alternatively, the determination model creation unit 18 may create a determination model indicating relationships between the rotational speed and the bearing temperature and the shaft vibration value in a method such as regression analysis, machine learning, and deep learning for the learning data.

The storage unit 19 stores the learning data, the determination model, the shaft vibration calculation model, and the like.

(Process Before Actual Operation Starts)

The monitoring device 10 creates a determination model and monitors shaft vibrations on the basis of a reference according to operation conditions.

First, a process of acquiring learning data before the actual operation of the plant 1 starts and creating the determination model will be described.

Figure 5:
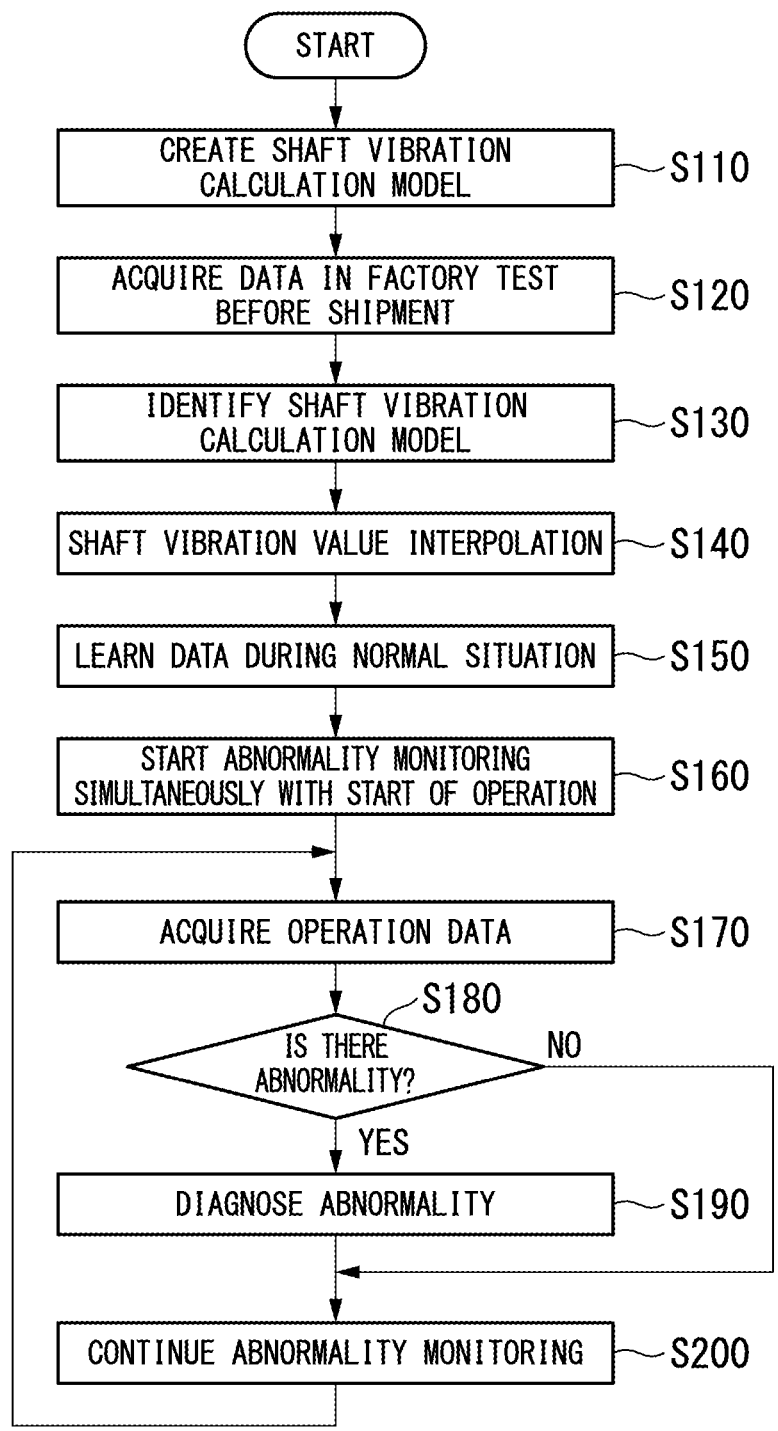
FIG. 5 is a flowchart showing an example of a new determination model creation process and a monitoring process according to an embodiment of the present invention.

FIG. 5 is a flowchart showing an example of a new determination model creation process and a monitoring process according to an embodiment of the present invention.

As a premise, it is assumed that the plant 1 is before shipment. As described with reference to FIG. 1, the rotational speed of the rotor 6, the bearing temperature of the rotor 6, and the shaft vibration are measured by the respective sensors and output to the monitoring device 10.

First, a staff member of the manufacturer inputs information such as a shape, a material, and a weight of the rotor 6 to the monitoring device 10 and issues an instruction for creating a shaft vibration calculation model. Then, the shaft vibration calculation model creation unit 16 creates the shaft vibration calculation model in a predetermined method (step S110). For example, shaft vibration analysis software using a known finite element method or the like can be used to create the shaft vibration calculation model.

Next, a test operation is performed in a factory test in the plant 1 before shipment and process data and a shaft vibration value are acquired (step S120). Specifically, the process data measurement unit 11 acquires the rotational speed and the bearing temperature of the rotor 6 during the test operation together with measurement times. The process data measurement unit 11 writes acquired data in the storage unit 19. Also, the shaft vibration measurement unit 12 acquires a voltage value corresponding to the shaft vibrations of the rotor 6 together with the time and the data calculation unit 13 converts the voltage value into a shaft vibration value. The data calculation unit 13 writes the shaft vibration value after the conversion in the storage unit 19. In the storage unit 19, respective values of the rotational speed, the bearing temperature, and the shaft vibration value measured during the test operation are recorded together with the time.

Next, the shaft vibration calculation model creation unit 16 reads the respective values of the rotational speed, the bearing temperature, and the shaft vibration value measured at the same time from the storage unit 19 and performs system identification with respect to the shaft vibration calculation model created in step S110 (step S130). In the test operation, an operation is performed while changing the rotational speed and the bearing temperature for the system identification. The shaft vibration calculation model creation unit 16 performs system identification by performing adjustment of a parameter of the shaft vibration calculation model and the like so that the shaft vibration value output by the shaft vibration calculation model matches the shaft vibration value actually measured in the test operation by inputting the rotational speed and the bearing temperature measured in the test operation to the shaft vibration calculation model. Although the shaft vibration calculation model obtained by performing the system identification is generally used for the purpose of ascertaining the critical speed by changing the rotational speed or ascertaining the spring characteristics of the bearing by changing the bearing temperature, the shaft vibration calculation model obtained by performing the system identification is also used for the purpose of generating learning data in the present embodiment.

Also, although the system identification is performed on the basis of data obtained in a factory test before shipment, an operation environment such as the hardness of an installation location differs between the factory and the installation destination of the plant 1. Accordingly, furthermore, the process data and the shaft vibration value may be acquired at the time of a trial operation at the introduction destination and final system identification may be performed using values thereof.

When the system identification of the shaft vibration calculation model is completed, the shaft vibration calculation model creation unit 16 saves the shaft vibration calculation model after the system identification in the storage unit 19. This shaft vibration calculation model accurately simulates the actual shaft vibration behavior of the rotor 6.

Next, the staff member performs an operation of issuing an instruction for the interpolation of learning data to the monitoring device 10. In response to this instruction operation, the shaft vibration analysis unit 17 performs a shaft vibration value interpolation process (step S140). For example, the shaft vibration analysis unit 17 generates a pseudo process data group in which the bearing temperature is fixed at T1 in the normal range and the rotational speed is changed from a minimum rotational speed RL to a maximum rotational speed RH in the normal range. Then, the shaft vibration analysis unit 17 inputs the bearing temperature T1 and a rotational speed R1 to the shaft vibration calculation model and outputs a shaft vibration value V1 of the rotor 6 under operation conditions thereof. The shaft vibration analysis unit 17 saves T1, RL, and V1 as a set in the storage unit 19. Likewise, the shaft vibration analysis unit 17 also calculates shaft vibration values with respect to other rotational speeds and saves a set of the operation condition and the calculation result (the shaft vibration value) in the storage unit 19. Furthermore, the shaft vibration analysis unit 17 changes the bearing temperature to a temperature other than T1 and changes the bearing temperature, for example, from a lowest temperature to a highest temperature in the normal range. The shaft vibration analysis unit 17 saves data including a bearing temperature, a rotation speed, and a shaft vibration value as a set when the rotation speed is changed over the entire normal range at each bearing temperature in the storage unit 19.

Alternatively, the shaft vibration analysis unit 17 may perform data generation based on the shaft vibration calculation model only with respect to a combination of the bearing temperature and the rotational speed that are not recorded in the storage unit 19 after the test operation (i.e., only with respect to the operation conditions that cannot be collected in the test operation).

Next, the determination model creation unit 18 learns data during a normal situation (step S150). Specifically, a relationship between a bearing temperature and a rotational speed in a normal range indicated by learning data saved in the storage unit 19 in steps S120 and S140 and a normal shaft vibration value at that time or a range of the normal shaft vibration value is learned and a determination model is created. When the bearing temperature and the rotational speed are input, the determination model outputs the normal shaft vibration value or the range of the normal shaft vibration value corresponding to the bearing temperature and the rotational speed. When the creation of the determination model is completed, the plant 1 and the monitoring device 10 can be actually operated.

Next, the actual operation of the plant 1 starts. At the same time, monitoring of the shaft vibrations by the monitoring device 10 starts (step S160). Specifically, first, the abnormality monitoring unit 14 acquires data (step S170). That is, the process data measurement unit 11 acquires a rotational speed and a bearing temperature of the rotor 6 during the actual operation and outputs the rotational speed and the bearing temperature of the rotor 6 to the abnormality monitoring unit 14. Also, the data calculation unit 13 converts a voltage value corresponding to the shaft vibrations of the rotor 6 acquired by the shaft vibration measurement unit 12 into a shaft vibration value and outputs the shaft vibration value after the conversion to the abnormality monitoring unit 14.

The abnormality monitoring unit 14 determines whether or not the measured shaft vibration value is abnormal (step S180). Specifically, the abnormality monitoring unit 14 inputs the rotational speed and the bearing temperature acquired in step S170 to the determination model. The abnormality monitoring unit 14 compares the normal shaft vibration value output from the determination model with the shaft vibration value acquired in step S170. If a difference between the two shaft vibration values is in a predetermined allowable range, the abnormality monitoring unit 14 determines that the shaft vibration value is normal. Alternatively, the abnormality monitoring unit 14 determines that the shaft vibration value is normal if the shaft vibration value acquired in step S170 is included in the range of the normal shaft vibration value output from the determination model.

When the abnormality monitoring unit 14 determines that the shaft vibration value is normal (step S180; No), the abnormality monitoring unit 14 saves the rotational speed and the bearing temperature of the rotor 6 determined to be normal and a measurement value of the shaft vibration value acquired from the data calculation unit 13 as a set in the storage unit 19 together with measurement times thereof. Next, as will be described with reference to FIG. 6, data saved during the actual operation is used to update the shaft vibration calculation model and the determination model.

When the abnormality monitoring unit 14 determines that the shaft vibration value is abnormal (step S180: Yes), the abnormality monitoring unit 14 performs predetermined abnormality diagnosis (step S190). For example, causes of abnormalities (damage to a bearing, damage to the rotor 6, abnormal vibrations of an impeller, and the like) suspected for each frequency of the shaft vibration value may be registered in the storage unit 19 and the abnormality monitoring unit 14 may estimate the causes of the abnormalities by performing frequency analysis with respect to shaft vibrations. Also, a monitoring person may take a measure such as the reduction of the rotational speed of the rotor 6 as necessary.

Regardless of the determination result of step S180, the monitoring device 10 continues to monitor the abnormality (step S200)). That is, during the operation of the plant 1, the processing from step S170 is iteratively executed.

In the present embodiment, it is possible to obtain the behavior of normal shaft vibrations when the operation condition changes by performing shaft vibration calculation under all operation conditions (a rotational speed, a bearing temperature, and the like) that can occur in the actual machine in advance and causing learning to be performed. Because the shaft vibrations can be monitored on the basis of the normal value of the shaft vibration value corresponding to the operation condition, it is possible to prevent shaft vibration abnormality from being erroneously detected and detect only true abnormalities even if the monitoring target is a turbomachine that requires a change in the operation condition.

Also, according to the present embodiment, it is possible to promptly collect normal shaft vibration values with respect to all patterns in which the operation condition changes in the normal range in a calculation process based on a computer by means of a shaft vibration calculation model identified by a system during a test operation or a trial operation of an actual machine. Then, it is possible to create a determination model for detecting the abnormality of the shaft vibrations using collected huge data as learning data. That is, it is possible to construct a determination model capable of coping with all operation conditions that can be required in the plant 1 without difficulty before the start of the actual operation. Thereby, it is possible to monitor the abnormality from the start of the actual operation and eliminate the need for long-term advance data acquisition for abnormality monitoring that is a conventional problem.

(Responding to Changes in Shaft Vibration Characteristics Due to Secular Deterioration)

Next, a process of updating a shaft vibration calculation model and a determination model after the start of the actual operation will be described. If the process described in FIG. 5 is performed and the actual operation and monitoring are continued, deterioration over time occurs in the plant 1. For example, thickness reduction occurs due to wear of a pivot portion of the bearing or wear of a blade due to working fluid. Under this influence, shaft vibration characteristics of the rotor 6 also change. If the determination model is not updated in accordance with such a change, there is a possibility of erroneous detection. Therefore, the monitoring device 10 periodically updates the shaft vibration calculation model using the shaft vibration value during monitoring. However, when a change in the shaft vibration value due to deterioration over time is excessively large, a problem is caused from the viewpoint of maintaining the function. Accordingly, a difference between the current shaft vibration value and the normal shaft vibration value at the time of the start of the operation is calculated. If the difference is in an allowable range, the shaft vibration calculation model is updated. Also, learning data is generated by calculating a shaft vibration value reflecting an influence of deterioration over time under all operation conditions according to the updated shaft vibration calculation model and a relationship between process data and shaft vibration values after the deterioration over time is relearned to update the determination model. Thereby, it is possible to distinguish between a change in the normal shaft vibration value caused by the deterioration over time and a true abnormal value and to accurately detect abnormalities.

Figure 6:
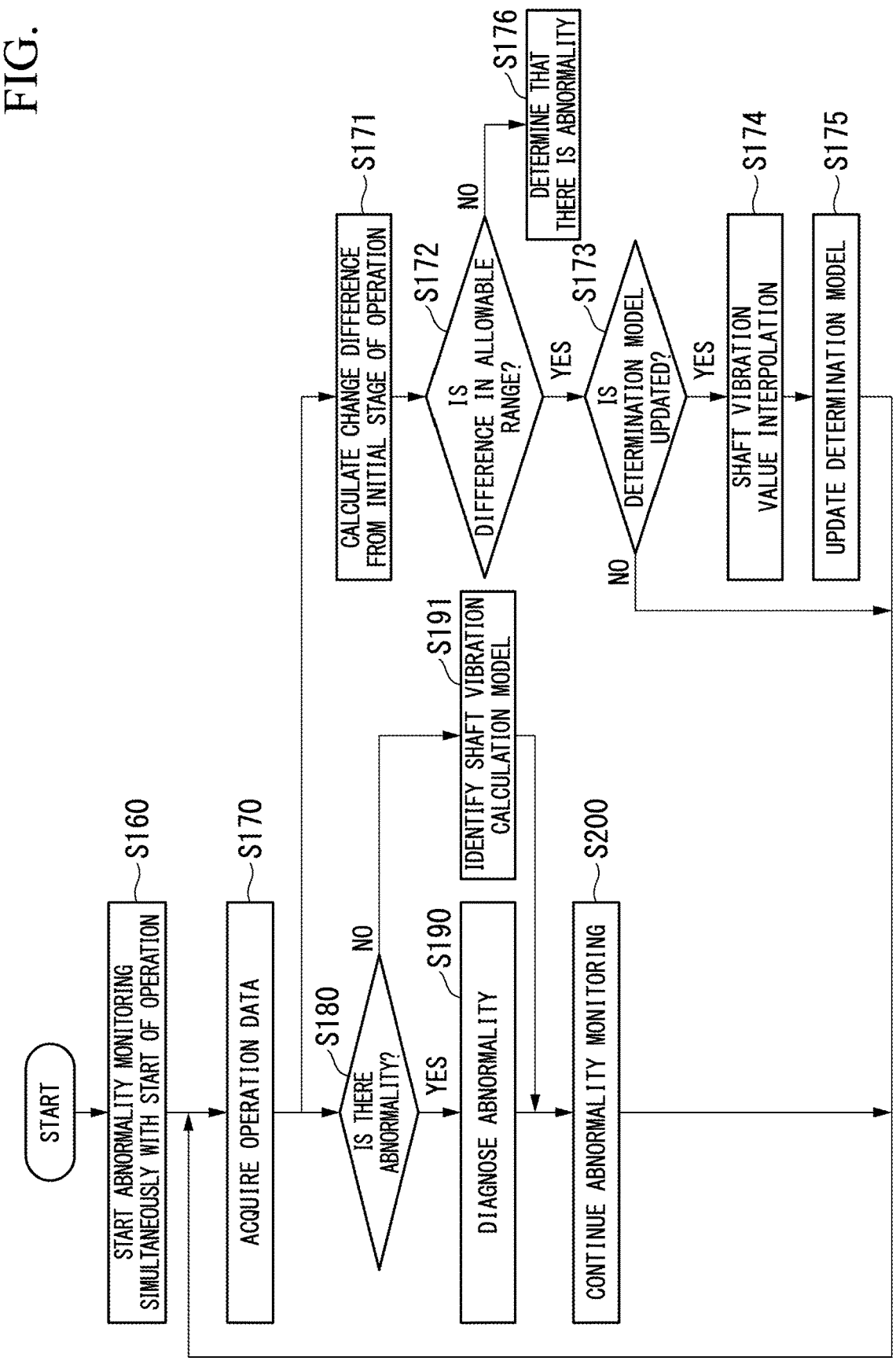
FIG. 6 is a flowchart showing an example of a determination model update process and a monitoring process according to an embodiment of the present invention.

FIG. 6 is a flowchart showing an example of a determination model update process and a monitoring process according to an embodiment of the present invention.

A process similar to that of the flowchart of FIG. 5 will be briefly described. As a premise, it is assumed that a process of the flowchart shown in FIG. 5 is executed and the monitoring device 10 is monitoring the plant 1. That is, the monitoring device 10 is starting abnormality monitoring together with the start of an operation (step S160). Next, the abnormality monitoring unit 14 acquires process data and a shaft vibration value (step S170) and determines whether or not there is an abnormality (step S180). In the case of the abnormality (step S180; Yes), the abnormality monitoring unit 14 performs abnormality diagnosis (step S190). In the case of normality (step S180; Yes), the abnormality monitoring unit 14 saves the rotational speed, the bearing temperature, and the shaft vibration value which are determined to be normal as a set in the storage unit 19. Also, the shaft vibration calculation model creation unit 16 performs system identification of the shaft vibration calculation model using the rotational speed, the bearing temperature, and the shaft vibration value which are determined to be normal (step S191). Thereby, the current shaft vibration characteristics of the rotor 6 can be reflected in the shaft vibration calculation model. The shaft vibration calculation model creation unit 16 writes and stores a shaft vibration calculation model newly identified by the system in the storage unit 19 separately from the shaft vibration calculation model identified by the system before the start of the actual operation. The shaft vibration calculation model identified by the system before the start of the actual operation is described as a "shaft vibration calculation model (initial)" and the shaft vibration calculation model newly identified by the system is described as a "shaft vibration calculation model (latest)". The shaft vibration calculation model (latest) can calculate a shaft vibration value reflecting a change in shaft vibration characteristics of the rotor 6 due to a change over time. The monitoring device 10 continues the abnormality monitoring (step S200).

Also, in parallel with the processing from step S180, the shaft vibration calculation model creation unit 16 calculates a difference between a currently measured shaft vibration value and a normal shaft vibration value in the initial stage of the operation obtained by inputting a currently measured rotational speed and bearing temperature to the shaft vibration calculation model (initial) (step S171). The shaft vibration calculation model creation unit 16 determines whether or not the difference is in a predetermined allowable range indicating an influence due to mild deterioration over time (step S172).

If the difference exceeds the range of influence due to the mild deterioration over time, the shaft vibration calculation model creation unit 16 determines that the difference is outside the allowable range. In this case, there is a possibility that some abnormality has occurred around the rotor 6 or that deterioration over time is in progress. In this case, the monitoring device 10 determines that there is an abnormality (step S176). The monitoring person may reduce the rotational speed of the plant 1 or stop the operation.

If the difference is in the allowable range (step S172; Yes), the determination model creation unit 18 determines whether or not the determination model needs to be updated (step S173). For example, if the difference is 0 or in a range in which the difference can be regarded to be an error, there is little need to update the determination model because a change is considered to be absent in shaft vibration characteristics due to deterioration over time. Also, when the difference is larger than the error and is within a change width due to deterioration over time, the shaft vibration characteristics of the rotor 6 are considered to have changed due to deterioration over time. In this case, the determination model creation unit 18 reconstructs the determination model using learning data reflecting the shaft vibration characteristics after a change over time.

For example, the determination model creation unit 18 determines to update the determination model when the difference is continuously within a change width due to deterioration over time a predetermined number of times or when the difference is within the above-described change width a predetermined number of times or more within a predetermined period of time. Alternatively, when the operation time required for the shaft vibration change due to deterioration over time to appear is known, the determination model creation unit 18 may determine to update the determination model when the actual operation time has reached the operation time.

When the determination model is determined to be updated (step S173; Yes), the shaft vibration analysis unit 17 first performs a shaft vibration value interpolation process (step S174). Although details of the process are similar to those of step S140 of FIG. 5, the shaft vibration analysis unit 17 uses the shaft vibration calculation model (latest) for calculation of the shaft vibration value. For example, the shaft vibration analysis unit 17 calculates shaft vibration values when the bearing temperature and the rotational speed are changed over the entire range in the normal range on the basis of the shaft vibration calculation model (latest) and saves the shaft vibration values as learning data in the storage unit 19.

Alternatively, the shaft vibration analysis unit 17 may calculate only shaft vibration values with respect to operation conditions other than an operation condition related to data in which an influence of deterioration over time is considered to be reflected (for example, data saved during a predetermined period before the determination model is determined to be updated) within saved data when Yes is determined in step S180.

Next, the determination model creation unit 18 updates the determination model (step S175). Specifically, on the basis of learning data saved in the storage unit 19 in step S174 and data measured during the actual operation saved during a predetermined period before the determination model is determined to be updated, the relationship between the rotational speed and the bearing temperature after the deterioration over time and the normal shaft vibration value is learned and a new determination model is created. The determination model creation unit 18 updates the determination model created before the actual operation with a newly created determination model. Thereby, in the next abnormality determination (step S180), abnormality determination is performed by the new determination model after the update.

According to the process of FIG. 6, even when the deterioration over time has occurred after the start of the actual operation, accurate abnormality detection is enabled by detecting only true abnormalities without erroneously detecting a change in shaft vibrations due to the deterioration over time within an allowable range as an abnormality. Also, it is possible to detect a limit of a change in the shaft vibration value due to the deterioration over time on the basis of an amount of change in the shaft vibration value from the start of the operation.

Figure 7:
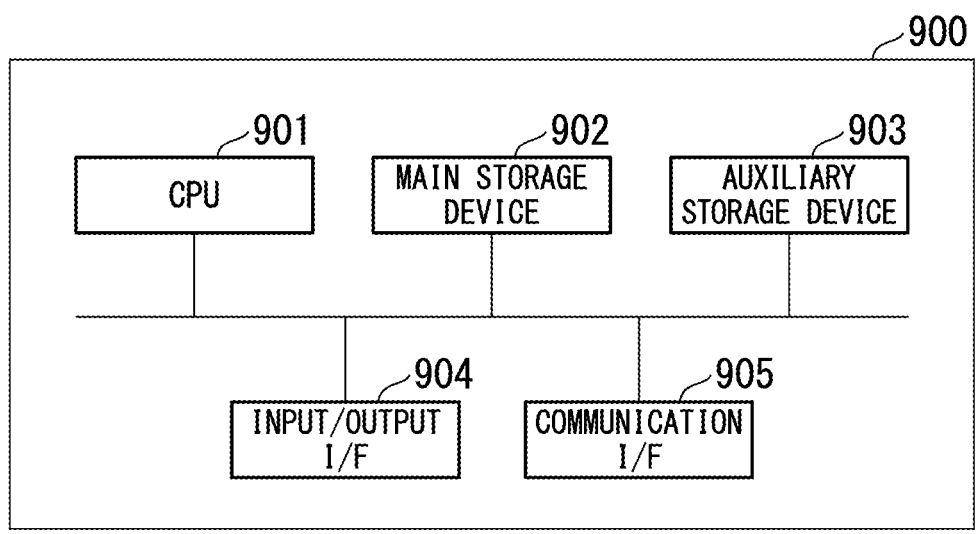
FIG. 7 is a diagram showing an example of a hardware configuration of a monitoring device according to an embodiment of the present invention.

FIG. 7 is a diagram showing an example of a hardware configuration of the monitoring device according to an embodiment of the present invention.

A computer 900 includes a CPU 901, a main storage device 902, an auxiliary storage device 903, an input/output interface (I/F) 904, and a communication I/F 905.

The above-described monitoring device 10 is mounted on the computer 900. Each function described above is stored in the auxiliary storage device 903 in the form of a program. The CPU 901 reads a program from the auxiliary storage device 903, loads the program to the main storage device 902, and executes the above-described process in accordance with the program. Also, the CPU 901 secures a storage area in the main storage device 902 in accordance with the program. Also, the CPU 901 secures a storage area for storing data which is being processed in the auxiliary storage device 903 in accordance with the program.

Also, a process of each functional unit may be performed by recording a program for implementing all or some functions of the monitoring device 10 on a computer-readable recording medium and causing a computer system to read and execute the program recorded on the recording medium. Also, the "computer system" used here is assumed to include an operating system (OS) and hardware such as peripheral devices. Also, the "computer system" is assumed to include a homepage providing environment (or displaying environment) when a World Wide Web (WWW) system is used. Also, the "computer-readable recording medium" refers to a storage device, including a portable medium such as a compact disc (CD), a digital versatile disc (DVD), and a universal serial bus (USB), a hard disk embedded in the computer system, and the like. Also, when the program is distributed to the computer 900 through a communication circuit, the computer 900 receiving the distributed program may load the program to the main storage device 902 and execute the above-described process. Also, the above-described program may be a program for implementing some of the above-described functions. Further, the above-described program may be a program capable of implementing the above-described function in combination with a program already recorded on the computer system.

Also, the monitoring device 10 may include a plurality of computers 900. The storage unit 19 may be stored in an external storage device that is separate from the computer 900. Also, a function of creating an estimation model (for example, the shaft vibration calculation model creation unit 16, the shaft vibration analysis unit 17, and the determination model creation unit 18) and a function of monitoring shaft vibration abnormalities (other function units) may be mounted on another computer 900.

Besides, without departing from the spirit of the present invention, it is possible to appropriately replace the constituent elements in the above-described embodiments with well-known constituent elements. Also, the technical scope of the presence invention is not limited to the above-described embodiments and various modifications may be made without departing from the spirit of the present invention.

For example, although the monitoring of the rotor of the compressor has been described as an example in the embodiment, the present invention can also be used for monitoring other rotating machines and turbomachines, for example, such as a compressor, a turbine, a steam turbine, a gas turbine, and a pump. In the example, data during a normal situation is used as the learning data. However, data during an abnormal situation may also be saved and the determination model creation unit 18 may calculate a boundary for distinguishing an operation condition and a shaft vibration value during the normal situation and an operation condition and a shaft vibration value during the abnormal situation and use the boundary as a determination model. Also, although the rotational speed and the bearing temperature are shown as the operation conditions, the bearing temperature may be the oil film temperature of the bearing.

EXPLANATION OF REFERENCES

1 Plant
2 Steam turbine

3 Medium pressure compressor
4 Low pressure compressor
5 High pressure compressor
6 Rotor
10 Monitoring device
11 Process data measurement unit
12 Shaft vibration measurement unit
13 Data calculation unit
14 Abnormality monitoring unit
15 Data recording unit
16 Shaft vibration calculation model creation unit
17 Shaft vibration analysis unit
18 Determination model creation unit
19 Storage unit
900 Computer
901 CPU
902 Main storage device
903 Auxiliary storage device
904 Input/output I/F
905 Communication I/F

What is claimed is:

1. A monitoring device comprising:
a vibration sensor that measures a shaft vibration value of a rotating shaft of a machine; and
one or more computers, wherein
the one or more computers:
acquire process data indicating an operation condition of the machine, the operation condition including a rotational speed of the rotating shaft and an oil film temperature of a sliding bearing supporting the rotating shaft;
acquire a measurement value of the shaft vibration value of the rotating shaft from the vibration sensor under the operation condition indicated by the process data;
create a predetermined shaft vibration calculation model using the process data and the measurement value of the shaft vibration value that have been acquired, wherein
the process data indicates the rotational speed within a first predetermined range and the oil film temperature within a second predetermined range, and
the predetermined shaft vibration calculation model is a dynamic physical model that includes rigidity and damping characteristics of a support of the rotating shaft in the machine, and simulates shaft vibrations of the rotating shaft under operation conditions indicated by process data;
calculate, using the predetermined shaft vibration calculation model, a shaft vibration value under the operation condition under which process data and a measurement value of the shaft vibration value have not been acquired during an operation of the machine;
create a determination model configured to determine a normal value of the shaft vibration value at any rotational speed within the first predetermined range and any oil film temperature within the second predetermined range, based on:
the process data,
the measurement value of the shaft vibration value measured during an operation of the machine, and
the shaft vibration value calculated using the predetermined shaft vibration calculation model;
evaluate the measurement value of the shaft vibration value with respect to the normal value of the shaft vibration value determined by the determination model; and
reduce the rotational speed,
wherein the one or more computers calculate the shaft vibration value corresponding to the operation condition of a predetermined range, and
wherein the one or more computers create the determination model by supplementing a value of the shaft vibration value not acquired during the operation of the machine and required for creating the determination model with the shaft vibration value calculated by using the predetermined shaft vibration calculation model.

2. The monitoring device according to claim 1, wherein, when a set of the process data acquired at a trial operation in a manufacturing factory before shipment or a trial operation before an actual operation and a measurement value of the shaft vibration value corresponding thereto is used as first learning data and a set of the shaft vibration value calculated based on the predetermined shaft vibration calculation model using the first learning data and process data indicating the operation condition corresponding thereto is used as second learning data, the one or more computers create an initial determination model that is the determination model based on the first learning data and the second learning data before the actual operation starts.

3. The monitoring device according to claim 1, wherein, when a set of the process data acquired at a test operation in a manufacturing factory before shipment or a trial operation before an actual operation and a measurement value of the shaft vibration value corresponding thereto is used as first learning data, the one or more computers update the predetermined shaft vibration calculation model based on the first learning data before the actual operation starts.

4. The monitoring device according to claim 1, wherein, when a set of the process data acquired at an actual operation and a measurement value of the shaft vibration value corresponding thereto is used as first learning data and a set of the shaft vibration value calculated based on the predetermined shaft vibration calculation model using the first learning data and process data indicating the operation condition corresponding thereto is used as second learning data, the one or more computers update an initial determination model based on the first learning data and the second learning data after the actual operation starts.

5. The monitoring device according to claim 4, wherein the one or more computers update the initial determination model when a difference between a shaft vibration value calculated based on the process data and the initial determination model, and a measurement value of the shaft vibration value is in a predetermined range.

6. The monitoring device according to claim 1, wherein, when a set of the process data acquired at an actual operation and a measurement value of the shaft vibration value corresponding thereto is used as first learning data, the one or more computers update the predetermined shaft vibration calculation model based on the first learning data after the actual operation starts.

7. The monitoring device according to claim 1, wherein the one or more computers calculate the shaft vibration value under each operation condition when the operation condition is changed over an entire normal range.

8. A monitoring method comprising the steps of:
measuring a shaft vibration value of a rotating shaft of a machine;

acquiring:
  process data indicating an operation condition of the machine, wherein the operation condition includes a rotational speed of the rotating shaft and an oil film temperature of a sliding bearing supporting the rotating shaft, and
  a measurement value of the shaft vibration value of the rotating shaft that is measured in the measuring step under the operation condition indicated by the process data;
creating a predetermined shaft vibration calculation model using the process data and the measurement value of the shaft vibration value that have been acquired, wherein
  the process data indicates the rotational speed within a first predetermined range and the oil film temperature within a second predetermined range, and
  the predetermined shaft vibration calculation model is a dynamic physical model that includes rigidity and damping characteristics of a support of the rotating shaft, and simulates shaft vibrations of the rotating shaft under operation conditions indicated by process data;
calculating a shaft vibration value, using the predetermined shaft vibration calculation model, under the operation condition under which process data and a measurement value of the shaft vibration value have not been acquired during an operation of the machine;
creating a determination model configured to determine a normal value of the shaft vibration value at any rotational speed within the first predetermined range and any oil film temperature within the second predetermined range, based on:
  the process data,
  the measurement value of the shaft vibration value measured during an operation of the machine, and
  the shaft vibration value calculated using the predetermined shaft vibration calculation model;
evaluating the measurement value of the shaft vibration value with respect to the normal value of the shaft vibration value determined by the determination model; and
reducing the rotational speed,
wherein in the step of calculating the shaft vibration value, calculating the shaft vibration value corresponding to the operation condition of a predetermined range, and
wherein in the step of creating the determination model, creating the determination model by supplementing a value of the shaft vibration value not acquired during the operation of the machine and required for creating the determination model with the shaft vibration value calculated by using the predetermined shaft vibration calculation model.

9. A non-transitory computer readable medium storing a program for causing a computer to execute a process comprising the steps of:

measuring a shaft vibration value of a rotating shaft of a machine;
acquiring:
  process data indicating an operation condition of the machine, wherein the operation condition includes a rotational speed of the rotating shaft and an oil film temperature of a sliding bearing supporting the rotating shaft, and
  a measurement value of the shaft vibration value of the rotating shaft that is measured in the measuring step under the operation condition indicated by the process data;
creating a predetermined shaft vibration calculation model using the process data and the measurement value of the shaft vibration value that have been acquired, wherein
  the process data indicates the rotational speed within a first predetermined range and the oil film temperature within a second predetermined range, and
  the predetermined shaft vibration calculation model is a dynamic physical model that includes rigidity and damping characteristics of a support of the rotating shaft in the machine and simulates shaft vibrations of the rotating shaft under operation conditions indicated by process data;
calculating a shaft vibration value, using the predetermined shaft vibration calculation model, under the operation condition under which process data and a measurement value of the shaft vibration value have not been acquired during an operation of the machine;
creating a determination model configured to determine a normal value of the shaft vibration value at any rotational speed within the first predetermined range and any oil film temperature within the second predetermined range, based on:
  the process data,
  the measurement value of the shaft vibration value measured during an operation of the machine, and
  the shaft vibration value calculated using the predetermined shaft vibration calculation model;
evaluating the measurement value of the shaft vibration value with respect to the normal value of the shaft vibration value determined by the determination model; and
reducing the rotational speed,
wherein in the step of calculating the shaft vibration value, calculating the shaft vibration value corresponding to the operation condition of a predetermined range, and
wherein in the step of creating the determination model, creating the determination model by supplementing a value of the shaft vibration value not acquired during the operation of the machine and required for creating the determination model with the shaft vibration value calculated by using the predetermined shaft vibration calculation model.

* * * * *